Figure 1:
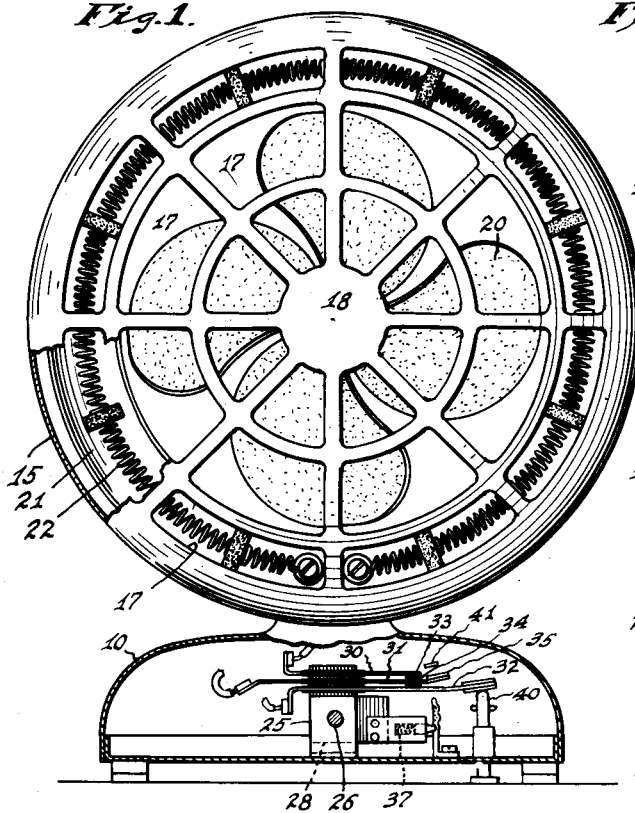

Jan. 29, 1952  J. P. THEISEN  2,583,754
ELECTRIC FAN AND HEATER
Filed Sept. 6, 1949  2 SHEETS—SHEET 1

INVENTOR.
JOHN P. THEISEN,
BY
ATTORNEYS.

Jan. 29, 1952 J. P. THEISEN 2,583,754
ELECTRIC FAN AND HEATER
Filed Sept. 6, 1949 2 SHEETS—SHEET 2

INVENTOR.
JOHN P. THEISEN,
BY
ATTORNEYS.

Patented Jan. 29, 1952

2,583,754

UNITED STATES PATENT OFFICE 2,583,754

ELECTRIC FAN AND HEATER

John P. Theisen, Columbus, Ind., assignor to Arvin Industries, Inc., a corporation of Indiana Application September 6, 1949, Serial No. 114,127

5 Claims. (Cl. 219—39)

This invention relates to electric room heaters and more particularly to a heater which will effectively serve as both a radiant heater and a circulating heater. It has heretofore been proposed to provide circulating heaters in which a rotating fan circulates air over an electrical resistance heating element. In such heaters, the air circulated over the heating element abstracts heat therefrom at a rate which prevents the element from reaching the temperature necessary to cause it to glow. As a result, the heat from such a heater is delivered almost entirely by convection.

It has also been proposed to provide radiant heaters in which there is no fan and an electrical resisting heating element, associated with an appropriate reflector, is heated well above the temperature at which it begins to glow. With such heaters, the heat is delivered almost entirely by radiation; and while a person positioned to receive the radiated heat experiences a feeling of warmth, the heater is of little benefit to persons located elsewhere.

It is therefore an object of this invention to produce an electric-room heater which will combine the advantages of a fan-forced heater and a radiant heater. More specifically, it is my object to produce a heater which will deliver a stream of heated air and which will also deliver radiant heat from a resistance heating element maintained at a temperature sufficient to cause it to glow. Another object of the invention is to produce such a heater which will be of attractive appearance and which can be simply and economically manufactured. A further object is to produce a heater in which a single heating element will be employed both to heat a stream of air and to radiate heat. Still another object of the invention is to produce a combined heater and fan and to provide such a device with a control means by which the fan can be operated independently of the heater. An additional object of the invention is to improve the aerodynamic efficiency of a fan or fan and heater combination.

In carrying out the invention in its preferred form, an annular heating element is employed, such heating element being backed by an annular, trough-like reflector. Coaxially with such reflector I provide a fan. Desirably, the fan and the reflector are approximately coplanar so that the reflector acts in a measure as a shroud for the fan. The reflector may be so arranged as to deliver radiant heat in the same general direction as the fan delivers air; or, if desired, the fan may be mounted for rotation about a vertical axis, the reflector arranged to deliver radiant heat outwardly in the plane of the fan, and the device provided with a conical deflector arranged coaxially with the fan to direct the air delivered upwardly therefrom outwardly in a horizontal sheet.

Figure 2:
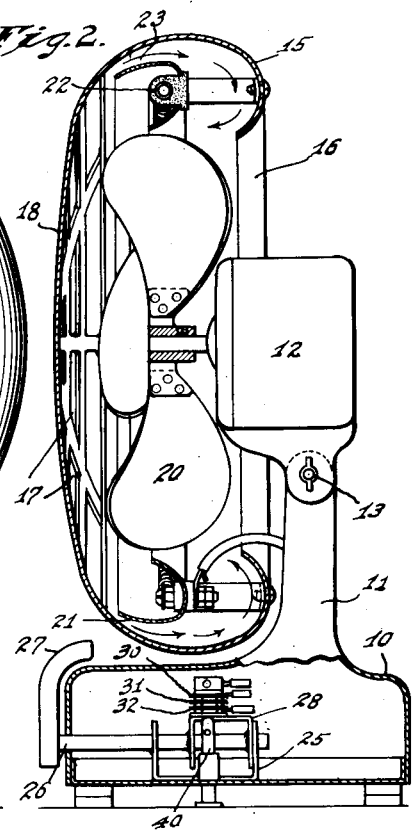
Figure 3:
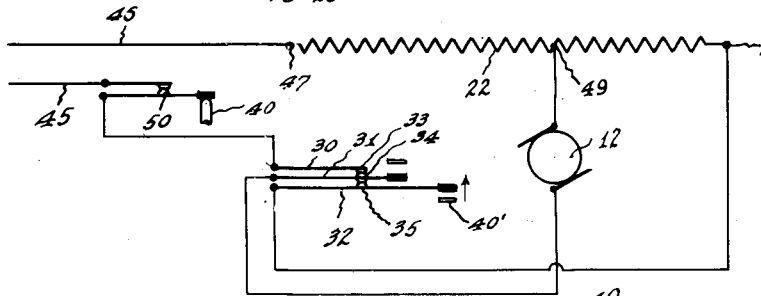
Figure 4:
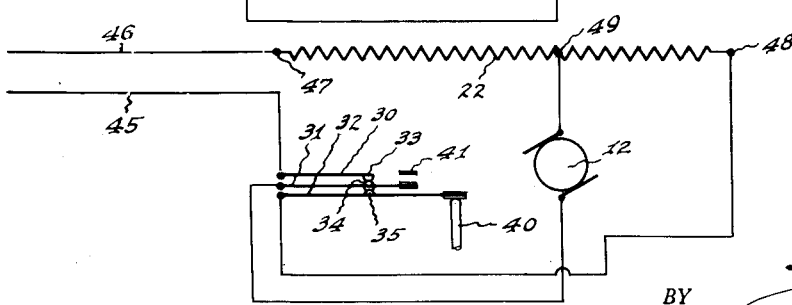
Figure 5:
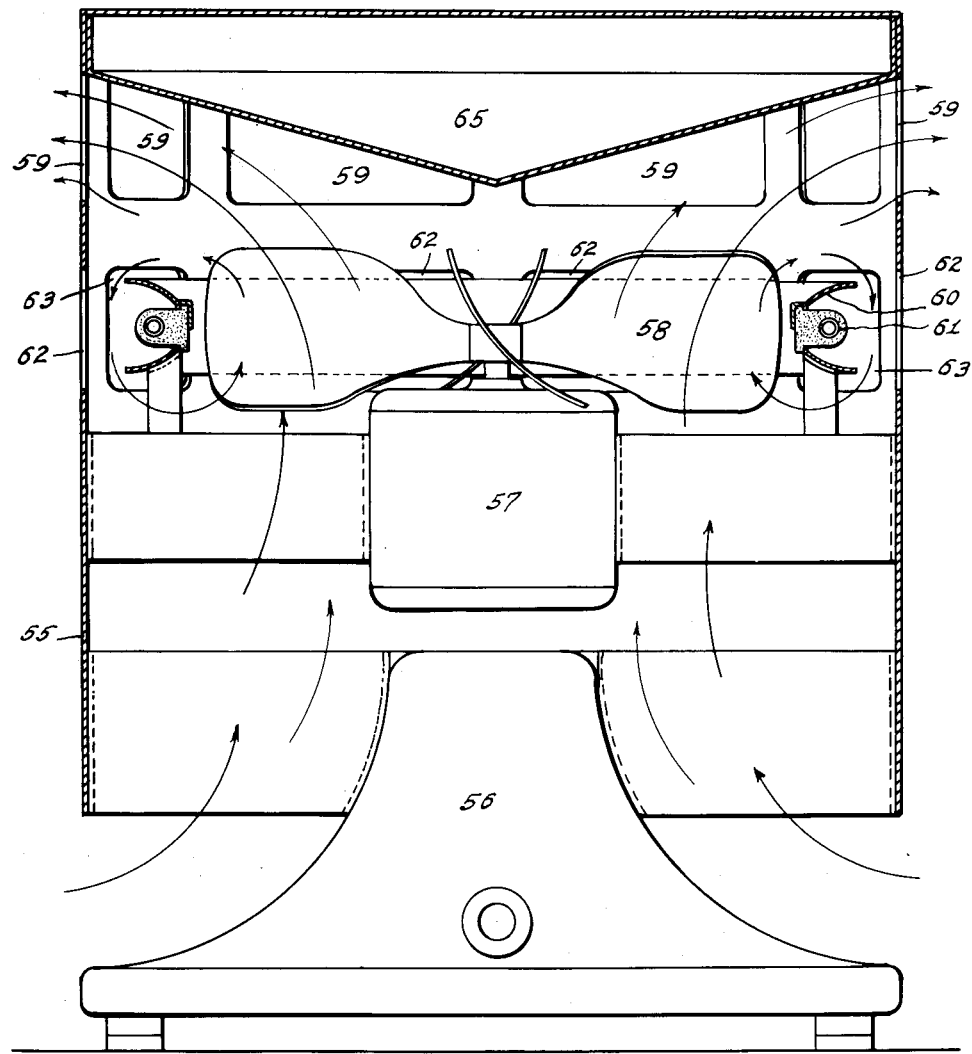

The accompanying drawings illustrate the invention: Fig. 1 is a front elevation in partial section of one form of combined fan and heater; Fig. 2 is a side elevation, in partial section, of the heater shown in Fig. 1; Figs. 3 and 4 are wiring diagrams illustrating alternative methods of wiring the device; and Fig. 5 is a vertical section through a modified form of the invention.

The device illustrated in Figs. 1 and 2 embodies a hollow base 10 having an upwardly projecting standard 11 to the upper end of which an electric motor 12 is secured for adjustment about the axis of a horizontal clamp bolt 13. Supported from the motor 12 is a housing 15 adapted at its rear for the entrance of air and at its front for the delivery of air. Conveniently, the housing 15 is formed of sheet metal and has a large central air-admitting opening 16 at its rear while its front is provided with a plurality of openings 17 leaving a grill work 18 preventing direct access to the interior of the housing.

The motor 12 has a forwardly projecting shaft upon which a fan 20 is rigidly mounted, the motor being arranged to rotate in such a direction that the fan will draw air inwardly through the opening 16 and discharge it forwardly through the openings 17. Supported from the housing 15 in the plane of the fan 20 is an annular, trough-like reflector 21 which opens forwardly with respect to the direction of air-discharge from the fan 20. An electrical resistance heating element 22 of annular form is supported within the reflector 21. Desirably, the external diameter of the reflector 21 is somewhat less than the interior diameter of the housing 15 with the result that an annular gap or opening 23 (Fig. 2) exists between the reflector and housing. In rear of such gap, the housing 15 preferably curves inwardly and forwardly for a purpose set forth below. The openings 17 in the front wall of the housing 15 include openings which expose the heating element 22 and the reflector behind it to view from in front of the device. In order to prevent too great a rise in the temperature of the housing, the outer edge of the reflector 21 may extend forwardly far enough to prevent direct heat rays from the element 22 from striking the housing at and adjacent the outer edges of the outermost openings 17.

For controlling operation of the fan and heating element I desirably employ switch mechanism which can be adjusted to permit operation of the fan with or without accompanying energization of the heating element. The particular form of switch mechanism illustrated in Figs. 1 and 2 comprises a bracket 25 which is mounted within the hollow base 10 and which supports a rock shaft 26. The rock shaft 26 extends through the front wall of the base 10, where there is rigidly secured to it a control member 27. Within the housing 10, there is secured to the rock shaft 26 a U-shaped member 28 which provides a support for a switch comprising three leaf springs 30, 31, and 32 which are insulated from each other and respectively carry cooperating contacts 33, 34, and 35. The leaf springs 30, 31, and 32 are so formed that the contacts 33 and 34 are biased toward engagement with each other while the contacts 34 and 35 are biased toward a separated condition. Detent mechanism 37 of any convenient form serves to hold the rock shaft 26 releasably in any of three different positions of adjustment. In the position of adjustment shown in Figs. 1 and 2, the switch mechanism is at the clockwise limit of its movement and the lowermost leaf spring 32 engages an abutment 40 which forces it upwardly to cause engagement of the contacts 34 and 35, the contacts 33 and 34 being in engagement by reason of the resilience of the leaf springs 30 and 31. As the rock shaft 26 is swung in a counter-clockwise direction from the position illustrated in Fig. 1, the spring 32 moves out of engagement with the abutment 40, thus permitting the contacts 34 and 35 to separate while the contacts 33 and 34 remain in engagement. In further counter-clockwise movement of the rock shaft 26, the end of the intermediate leaf spring 31 engages a second abutment 41 with the result that the contacts 33 and 34 are separated.

The abutment 40 shown in Figs. 1 and 2 embodies the invention set forth and described in the prior application of myself and Edward A. Farr, Serial No. 36,684 filed July 2, 1948. Such an abutment is slidably mounted in the hollow base 10 and projects downwardly therethrough for engagement with the floor or other supporting surface upon which the heater rests. The arrangement is such that in the absence of engagement of the abutment 40 with the floor or other supporting surface such abutment can slide downwardly under the pressure exerted upon it by the leaf spring 32 and thus permit the contacts 34 and 25 to separate even when the shaft 26 is at the clockwise limit of its movement.

The electric connections for the heater illustrated in Figs. 1 and 2 are shown in Fig. 4. Supply wires 45 and 46 are connected respectively to the upper switch-contact 33 and to one terminal 47 of the resistance heating element. The other terminal 48 of the heating element is connected to the lower switch-contact 35, and the motor 12 is connected between an intermediate tap 49 of the heating element and the intermediate switch-contact 34.

In Fig. 4, the switch 33—34—35 is shown in the position it occupies in Figs. 1 and 2, both of the contacts 33 and 35 being in engagement with the intermediate contact 34 to complete circuits through the motor and the entire heating element, the motor being in parallel with that section of the heating element between the points 48 and 49. If the shaft 26 is moved in a counter-clockwise direction from the position shown in Figs. 1 and 4 to its intermediate position, the lower leaf spring 32 moves out of engagement with the abutment 40, thus permitting the contacts 34 and 35 to assume their normal separated position. Separation of the contacts 34 and 35 opens the circuit between the heating-element terminal 48 and the supply wire 45; but the circuit through the heating-element section 47—49 and the motor 12 remains completed by reason of the engagement of the contacts 33 and 34. Further counterclockwise rotation of the shaft 26 brings the leaf spring 31 into engagement with the abutment 41 and causes separation of the contacts 33 and 34 to open the circuit through the heating-element section 47—49 and the motor 12.

From the above, it will be apparent that when the device is to be used as a heater the rock shaft 26 will be moved to the clockwise limit of its rotation to energize both the entire heating element and motor 12; that if the device is to be used as a fan, the shaft 26 is moved to its intermediate position to energize only the motor 12 and the section 47—49 of the heating element; and that when the device is not to be used as either as a fan or a heater the shaft 26 will be moved to its counter-clockwise limit of rotation to de-energize the entire heating element and the motor 12.

In the circuit illustrated in Fig. 4, it is to be understood that the resistance of the motor 12 is high with respect to that of the heating element. Accordingly, in the intermediate position of the switch, when the heating-element section 48—49 is de-energized, comparatively little current flows and the rate of heat emission from the heating element section 47—49 is insignificant. With the switch in the position shown in the drawing, however, the low-resistance heating-element section 48—49 will be connected in parallel with the motor and the current flowing through the entire heating element will be greatly increased.

The sliding abutment 40 operates as a safety device, as is more fully brought out in the prior application above referred to. Should the heater tip over, the abutment 40 will be freed from the upward reaction exerted on it by the floor, and the abutment can then move outwardly to permit separation of the contacts 34 and 35, thus effectively de-energizing the heating element. In such condition, the motor 12 will continue operating. If operation of the fan motor under such conditions is deemed undesirable, the arrangement of connections illustrated in Fig. 3 may be employed. There, the movable abutment 40 is replaced by a fixed abutment 40' positioned to hold the contacts 34 and 35 in interengagement when the shaft 26 is at the clockwise limit of its movement, and the sliding abutment 40 is employed to control an auxiliary switch 50 connected between the supply wire 45 and the upper switch-contact 33. In this arrangement, if the heater should tip over to free the sliding abutment 40 from the support provided by the floor, the switch 50 would open and de-energize both the heating element 22 and the motor 12.

In the modification illustrated in Fig. 5, a cylindrical casing 55 having an open lower end is supported in any convenient manner from a suitable base 56. Mounted within the casing is an electric motor 57 driving a fan 58, the motor being positioned with the shaft vertical so that the fan will rotate in a horizontal plane to induce an upward flow of air through the casing, which is provided adjacent its upper end with an annular series of air-outlet openings 59. In the plane of the fan, there is mounted an annular, trough-like reflector 60 having its reflective surface directed outwardly; and within such reflector, there is disposed an annular resistance heating element 61. In the plane of the reflector 60, the casing 55 is provided with an annular series of openings 62 through which the heating element 61 and reflector 60 are exposed to view. The reflector 60 has a maximum diameter somewhat less than the inner diameter of the casing 55 to leave an air gap indicated at 63 surrounding the reflector.

In the upper portion of the casing 55 there is a conical deflector 65 having its apex directed downwardly toward the fan and its base located adjacent the upper edges of the air-outlet opening 59. Such deflector serves to direct air from the fan out through the openings 59 in the general form of a horizontal sheet.

Electric connections for the heater shown in Fig. 5 are desirably arranged, like those shown in Figs. 3 and 4, to permit operation of the fan motor with or without accompanying energization of the heating element 61. As a result, the device may be used as a fan alone in hot weather to cause a forced circulation of air in a room. With the heating element energized, heated air is delivered from the outlet openings 59 and, in addition, radiant heat is delivered from the glowing resistance element 61 through the openings 62.

Although the heating element in each of the modifications above described is located within a reflector, the device is nevertheless operative to produce an appreciable rise in the temperature of the air circulated through it. As no reflector is prefect, the reflector employed in either modification undergoes a rise in temperature as a result of its proximity to the heating element; and the air flowing axially through the reflector is heated by contact therewith. In addition, because of the air gap 23 or 63 which surrounds the reflector, there is a considerable recirculation of air as indicated by the arrows in Fig. 5. As a result of operation of the fan, the static pressure of air on its discharge side is greater than that on its inlet side; and the differential pressure thus created results in an appreciable flow or recirculation of air over the open face of the reflector. Because of such recirculation, the air is maintained in immediate association with the reflector and in the vicinity of the heating element longer than it otherwise would be, and therefore undergoes an appreciable increase in temperature.

In the device of Figs. 1 and 2, the recirculated air passing rearwardly along the inner face of the side wall of the casing is directed inwardly and forwardly toward the rear face of the fan by the inwardly and forwardly curved rear wall of the casing, and thus enters again into association with the fan with a considerable component of forward velocity. As a result, the recirculated air and the air entering the casing through the opening 16 are flowing in the same general direction and merge into a single stream with far less eddying than would otherwise occur, and thus the aerodynamic efficiency of the fan is increased. I have found that the maximum velocity of air delivered by a fan enclosed in a casing of larger diameter than the fan can be increased as much as forty per cent by providing means, such as the rear casing-wall shown in Fig. 2, which will act on air flowing rearwardly beyond the periphery of the fan and deflect such air inwardly toward the fan-axis and forwardly toward the rear face of the fan. In many instances the stream of air flowing rearwardly within the casing and beyond the periphery of the fan will not be made up entirely of air coming directly from the fan. In an arrangement of the type shown in Figs. 1 and 2, for example, some air may pass inwardly through the outer portions of the outermost openings 17 at the front of the casing and then flow rearwardly along the inner surface of the side wall of the casing; and such air is included within the meaning of the term "recirculated air" as used herein.

I claim as my invention:

1. In a room heater, a rotatable fan, means for rotating the fan, an annular, trough-like reflector surrounding and acting as a shroud for said fan, an annular electrical-resistance heating element arranged within said reflector and a casing surrounding said reflector, said casing having an inlet opening in rear of said fan, an outlet opening in front of said fan, and an annular side wall spaced outwardly from the reflector to define in co-operation therewith a passage for recirculating air.

2. A heater as set forth in claim 1 with the addition that the open side of said reflector is presented axially with reference to the fan and in the direction in which the fan discharges.

3. In a heater, a casing having an air-inlet opening in its rear wall, an annular, trough-like reflector mounted within said casing with its open face presented forwardly, a rotatable fan, means for rotating said fan to cause it to draw air inwardly through said inlet opening and propel it forwardly through said reflector, and an annular electrical-resistance heating element mounted in said reflector, the front wall of said casing being provided with openings for the discharge of air from said fan and the passage of radiant heat from said heating element, said reflector being of smaller diameter than said casing to provide an annular gap through which air may flow rearwardly, the rear wall of said casing in rear of said gap being curved inwardly and forwardly to direct such rearward flowing air forwardly toward the rear of the fan.

4. In combination, a rotatable fan, a casing enclosing said fan, said casing having an annular side wall of larger diameter than the fan and a rear wall provided with a central air inlet opening, said casing being open at its front for the discharge of air, the rear wall of said casing curving inwardly and forwardly from said side wall to the periphery of said inlet opening to direct against the rear face of the fan any air which flows rearwardly between the periphery of the fan and the side wall of the casing.

5. In combination, a rotatable fan, a casing enclosing said fan, said casing having an annular side wall of larger diameter than the fan, said casing further having an air inlet opening at its rear and an air discharge opening at its front, and an annular air deflector curved inwardly and forwardly in axial section to direct toward the rear face of the fan any air flowing rearwardly between the side wall of the casing and periphery of the fan.

JOHN P. THEISEN.

REFERENCES CITED

The following references are of record in the file of this patent:

UNITED STATES PATENTS

| Number | Name | Date |
| --- | --- | --- |
| 1,399,688 | Carmean et al. | Dec. 6, 1921 |
| 1,450,589 | Graff et al. | Apr. 3, 1923 |
| 1,813,023 | Cheslock et al. | July 7, 1931 |
| 1,926,537 | Hoffman | Sept. 12, 1933 |
| 1,958,007 | MacDougall | May 8, 1934 |
| 1,967,757 | Losee | July 24, 1934 |